(12) United States Patent
Kitamura (10) Patent No.: US 9,098,178 B2
(45) Date of Patent: Aug. 4, 2015

(54) INFORMATION PROCESSING APPARATUS AND IMAGE FORMING APPARATUS

(71) Applicant: KYOCERA Document Solutions Inc., Osaka-shi (JP)

(72) Inventor: Tetsuro Kitamura, Osaka (JP)

(73) Assignee: KYOCERA DOCUMENT SOLUTIONS INC., Osaka-Shi (JP)

( * ) Notice: Subject to any disclaimer, the term of this patent is extended or adjusted under 35 U.S.C. 154(b) by 120 days.

(21) Appl. No.: 13/870,755

(22) Filed: Apr. 25, 2013

(65) Prior Publication Data

US 2013/0285955 A1 Oct. 31, 2013

(30) Foreign Application Priority Data

Apr. 27, 2012 (JP) .................................. 2012-102115

(51) Int. Cl.
*G06F 3/0484* (2013.01)
*G06F 3/041* (2006.01)
*G06F 3/048* (2013.01)

(52) U.S. Cl.
CPC ............ *G06F 3/04842* (2013.01); *G06F 3/041* (2013.01); *G06F 3/048* (2013.01)

(58) Field of Classification Search
CPC ... G06F 3/0416; G06F 3/0482; G06F 3/0486; G06F 3/0488; G06F 3/041

USPC ......................................................... 345/173
See application file for complete search history.

(56) References Cited

U.S. PATENT DOCUMENTS

| | | | |
|---|---|---|---|
| 8,407,606 B1 * | 3/2013 | Davidson et al. | 715/754 |
| 2008/0297482 A1 * | 12/2008 | Weiss | 345/173 |
| 2009/0307623 A1 * | 12/2009 | Agarawala et al. | 715/765 |
| 2010/0026649 A1 * | 2/2010 | Shimizu et al. | 345/173 |
| 2010/0283758 A1 | 11/2010 | Homma et al. | |
| 2012/0113007 A1 * | 5/2012 | Koch et al. | 345/168 |

FOREIGN PATENT DOCUMENTS

JP 2010-262556 A 11/2010

* cited by examiner

*Primary Examiner* — Chanh Nguyen
*Assistant Examiner* — Daniel Duong
(74) *Attorney, Agent, or Firm* — Knobbe Martens Olson & Bear LLP (57) ABSTRACT

An image forming apparatus 1 of the present disclosure has a display unit 162 capable of displaying a plurality of objects such as small images and a touch detection unit 164 which meets multi-touch, these units being formed on an operation panel unit 6. A touched shape determination unit 81 calculates a touched area from touch coordinates detected by the touch detection unit 164. Then, the touched shape determination unit 81 calculates a touched shape like line strip from the touched area. A selection area setting/moving unit 82 calculates an object selection area which is a closed touched shape and selects and moves all objects which overlap the object selection area.

8 Claims, 5 Drawing Sheets

INFORMATION PROCESSING APPARATUS AND IMAGE FORMING APPARATUS

INCORPORATION BY REFERENCE

This application is based upon and claims the benefit of priority from the corresponding Japanese Patent Application No. 2012-102115, filed in the Japan Patent Office on Apr. 27, 2012, the entire contents of which are incorporated herein by reference.

BACKGROUND

The present disclosure relates to an information processing apparatus and an image forming apparatus, more particularly to an information processing apparatus and an image forming apparatus which allow a user to select a displayed object by way of a touch panel.

Conventionally, there has existed an information processing apparatus which includes a display unit such as a flat display panel and an electrostatic capacity type/resistive film type touch panel and which is capable of detecting a user's touch. Such an information processing apparatus allows a user to select an object such as a small image displayed on a display unit based on touch coordinates in order to make its processing based on the selection.

Here, as a conventional information processing apparatus for selecting an object on the touch panel, there has been known a technology about an information processing apparatus which includes a display means which displays an image containing the object; a detection means which is overlaid on the display means and detects a contact with the display means; and a control means which changes over an operation mode to the display means based on a ratio of an area of the object displayed on the display means with respect to the size of the area of the display means detected by the detection means. This information processing apparatus allows a user to operate the display means directly and naturally by selecting a plurality of small objects on the touch panel of its high-precision display in an "aggregation" manner.

This technology automatically changes over its operation mode to the "aggregation" mode depending on a relation between the size of an area touched by the finger on the touch panel and an area of the displayed object. That is, if the area touched with the finger is larger than the area of the object, the "aggregation" mode is selected. However, according to the aforementioned technology, even if the finger touches a large object, the "aggregation" mode is not activated. That is, because the conventional technology is so configured that the operation mode is changed over to the "aggregation" mode depending on the size of an object, an inconvenience to the user may occur, which is a problem to be solved by the present disclosure.

SUMMARY

An information processing apparatus of the present disclosure has a display unit which displays a plurality of objects and a touch detection unit that detects a plurality of touch coordinates on the display unit, the information processing apparatus including: a touched shape determination unit and a selection area setting/moving unit. The touched shape determination unit calculates a touched shape from the touch coordinates detected by the touch detection unit. The selection area setting/moving unit, if the touched shape is in a hook-like shape, calculates an object selection area which is presented by closing the touched shape and selects and moves all the objects that overlap the object selection area.

DETAILED DESCRIPTION

Examples
Configuration of Image Forming Apparatus 1

Figure 1:
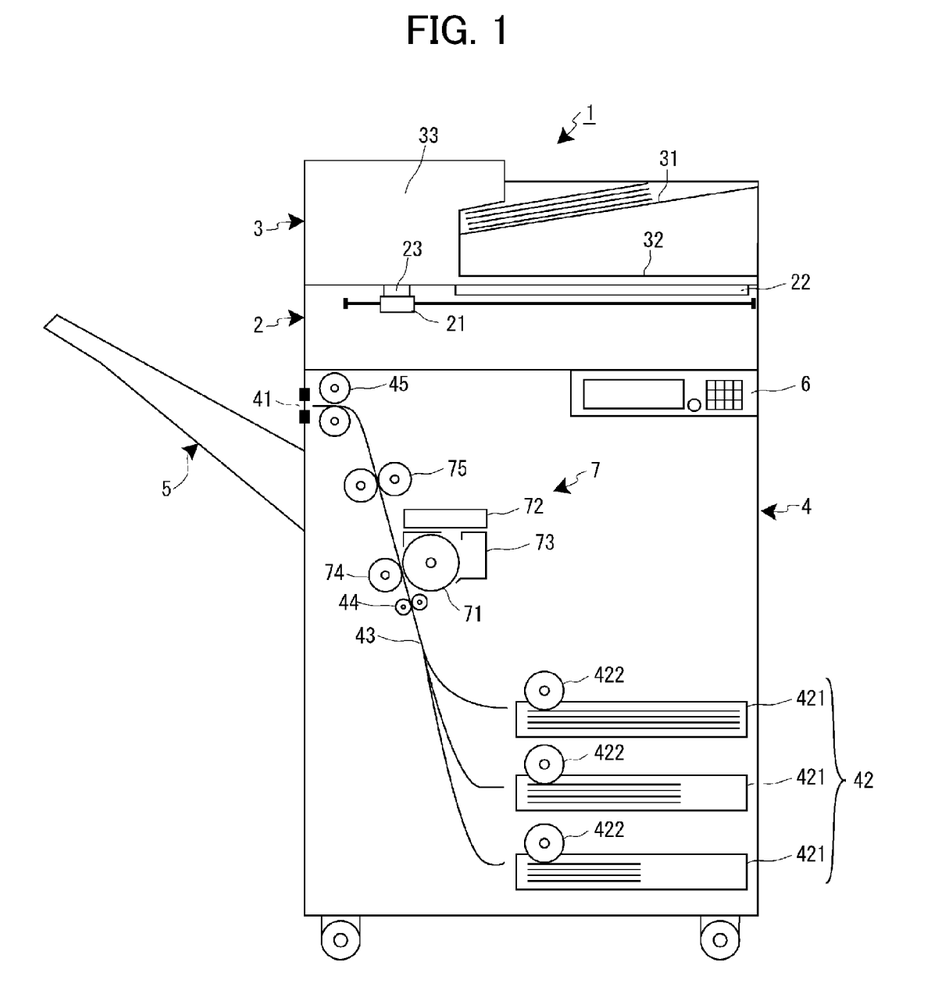
FIG. 1 is a schematic cross-sectional view illustrating an internal structure of the image forming apparatus 1 according to an embodiment of the present disclosure.

A configuration of an image forming apparatus 1 according to an embodiment of the present disclosure will be described in detail with reference to FIGS. 1, 2. According to FIG. 1, the image forming apparatus (information processing apparatus or computer) of the present embodiment is a copying machine or multifunction peripheral (multifunctional printer, MFP). The image forming apparatus 1 includes a document reading unit 2, a document feeding unit 3, a main body unit 4, a stack tray 5, and an operation panel unit 6. The document reading unit 2 is arranged on top of the main body unit 4. The document feeding unit 3 is arranged on top of the document reading unit 2. The stack tray 5 is arranged on the recording paper discharge opening 41 side of the main body unit 4. The operation panel unit 6 is arranged on the front side of the image forming apparatus 1.

The document reading unit 2 includes a scanner 21, a platen glass 22, and a document reading slit 23. The scanner 21 includes an exposure lamp, charge coupled device (CCD) or complementary metal oxide semiconductor (CMOS) image sensor, and is movable in a conveyance direction of a document by the document feeding unit 3. The platen glass 22 is a document platform made of transparent material such as glass. The document reading slit 23 is a slit formed in a direction orthogonal to the document conveyance direction by the document feeding unit 3.

When reading a document placed on the platen glass 22, the scanner 21 moves to a position where it faces the platen glass 22, reads a document by scanning the document placed on the platen glass 22 to obtain image data and outputs the acquired image data to the main body unit 4. When reading the document carried by the document feeding unit 3, the scanner 21 moves to a position where it faces the document reading slit 23, reads the document synchronously with a document feeding action of the document feeding unit 3 through the document reading slit 23 to obtain image data and outputs the acquired image data to the main body unit 4.

The document feeding unit 3 includes a document stacking stand 31, a document discharge unit 32, and a document feeding mechanism 33. The documents stacked on the document stacking stand 31 are fed sequentially one by one by the document feeding mechanism 33, carried to a position facing the document reading slit 23 and after that, discharged to the document discharge unit 32. The document feeding unit 3 is openable with respect to the document reading unit 2. Raising the document feeding unit 3 upward opens the top face of the platen glass 22.

The main body unit 4 includes a recording unit 7, a paper feeding unit 42, a paper conveyance path 43, a conveyance roller 44, and a discharge roller 45. The paper feeding unit 42 includes a plurality of paper feeding cassettes 421 which store recording papers different in size or direction and paper feeding rollers 422 which feed recording papers one by one from each of paper cassettes 421 to the paper conveyance path 43. The paper feeding roller 422, the conveyance roller 44, and the discharge roller 45 function as a conveyance unit. The recording paper is conveyed by this conveyance unit. The recording paper fed by the paper feeding roller 422 to the paper conveyance path 43 is conveyed to the recording unit 7 by the conveyance rollers 44. After recording is performed by the recording unit 7, the recording paper is discharged to the stack tray 5 by the discharge roller 45.

The operation panel unit 6 includes mainly a button section 160 (input means), a display unit 162 (display means), and a touch detection unit 164 (input means, touch detection means).

The button section 160 includes buttons provided with a start key, ten-key and the like. The button section 160 changes over an operation mode for, mainly, copying, facsimile transmission, scanner operation and the like, executes printing, transmission and receiving of a selected document, and detects a variety of user's instructions relating to selection of an object and the like, as described below. A signal concerning an instruction detected by the button section 160 is transmitted to the control unit 8.

The display unit 162 is a flat display panel such as a liquid crystal display (LCD), organic electro-luminescence display (GELD), field emission display (FED), a projector, a status-indication LED or the like. The display unit 162 can display an object such as a small image like a thumbnail or icon as well as characters, images. The display unit 162 can display these objects (a thumbnail corresponding to a file such as document or image, icon and the like) corresponding to a mode. The display unit 162 can display an operation instruction, a mode, a job and a status of each processing of the image forming apparatus 1 and an object indicating a concept like a folder existing on LAN or WAN, stored in a memory unit 9.

The touch detection unit 164 is a touch sensor such as an electrostatic capacity type touch panel, a resistive film type touch panel, a liquid crystal panel with light-receiving element, a laser or infrared ray optical sensor, a back-projection infrared ray LED, a CCD/CMOS sensor or the like. When the flat display panel of the display unit 162 is touched by a user's hand or finger, or a glove or a pen, the touch detection unit 164 detects a position which is touched as "touch coordinates" by way of its sensor. In addition, the touch detection unit 164 may be configured to detect, when a glove, a pen or the like exists in a predetermined range of several mm to several cm even without the glove or the pen touching the panel, and detect that position as "touch coordinates". The touch detection unit 164 meets a demand for "multi-touch" which is capable of detecting a plurality of touch coordinates substantially at the same time. The touch detection unit 164 is preferred to detect touch coordinates from the display unit 162 which is divided to grids spaced at a predetermined distance of, for example, 160 ×90.

The recording unit 7 includes a photosensitive drum 71, an exposure unit 72, an image forming unit 73, a transfer unit 74, and a fuser unit 75. The exposure unit 72 is an optical unit provided with a laser unit or an LED array, a mirror, a lens and the like. The exposure unit 72 exposes the photosensitive drum 71 by outputting light based on image data so as to form an electrostatic latent image on the surface of the photosensitive drum 71. The image forming unit 73 is a development unit which develops an electrostatic latent image formed on the photosensitive drum 71 using toner. The image forming unit 73 forms a toner image based on the electrostatic latent image on the photosensitive drum 71. The transfer unit 74 transfers the toner image formed on the photosensitive drum 71 by the image forming unit 73 onto a recording paper. The fuser unit 75 fixes the toner image on the recording paper by heating the recording paper on which the toner image has been transferred by the transfer unit 74.

Figure 2:
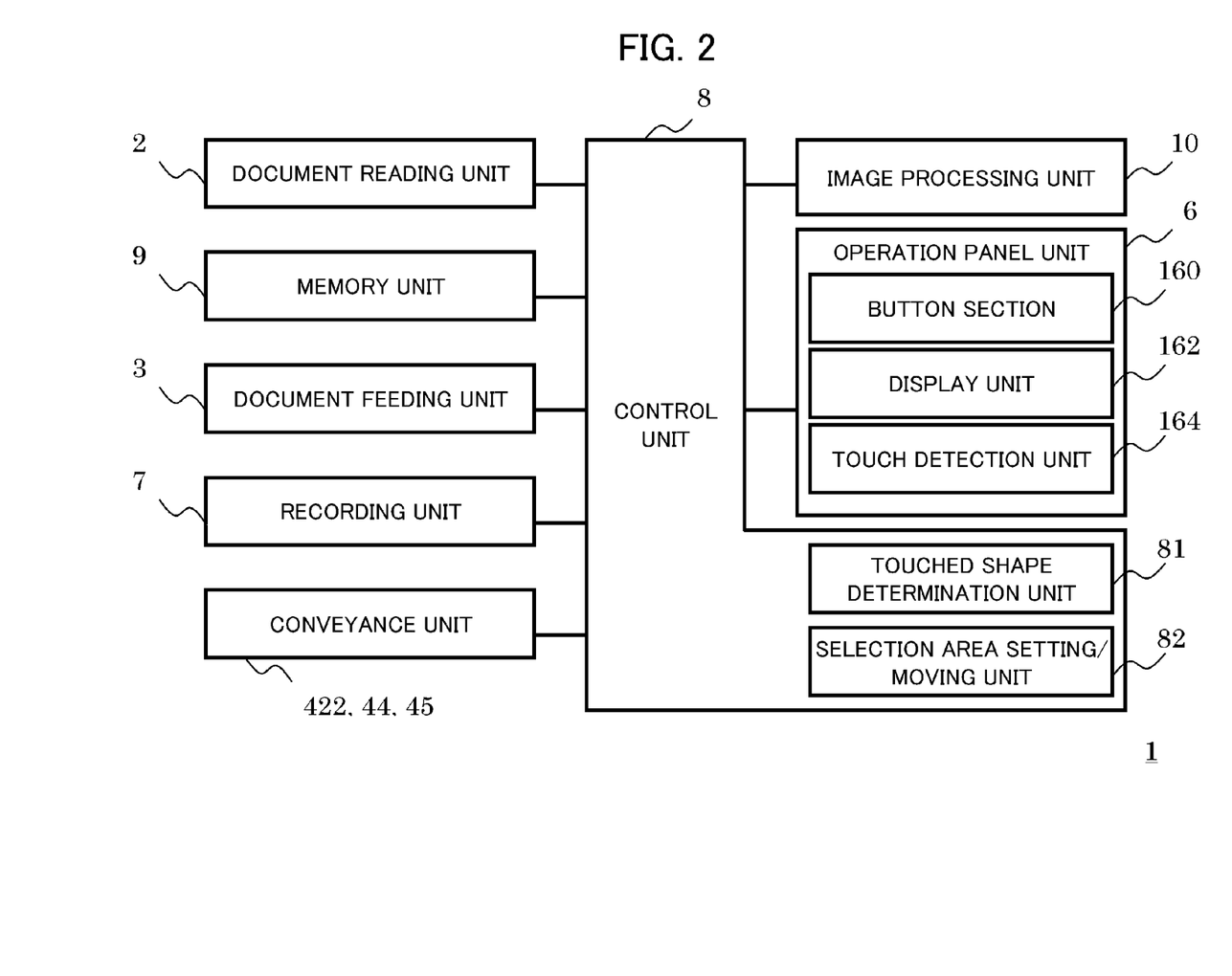
FIG. 2 is a block diagram showing a control configuration of an image forming apparatus 1 according to the embodiment of the present disclosure.

FIG. 2 illustrates a block diagram of the control configuration of the image forming apparatus 1. The aforementioned document reading unit 2, document feeding unit 3, conveyance unit (paper feeding roller 422, conveyance roller 44, discharge roller 45), operation panel unit 6 and recording unit 7 are connected to the control unit 8. Operations of these units are controlled by the control unit 8. The memory unit 9 (memory means) and an image processing unit 10 (image processing means, touch coordinates processing means) are connected to the control unit 8.

The control unit 8 is an information processing unit such as a microcomputer provided with a read only memory (ROM), random access memory (RAM) or the like. A control program for controlling an operation of the image forming apparatus 1 is stored in the ROM. The control unit 8 and the image processing unit 10 read the control program stored in the ROM and expand the control program over the RAM so as to control the entire apparatus in correspondence to predetermined instruction information input from the operation panel unit 6. Furthermore, the control unit 8 includes a touched shape determination unit 81 (touch shape determination means) and a selection area setting/moving unit 82 (object selection area setting means, object moving means).

The touched shape determination unit 81 can calculate a touched area 300 (FIG. 4) in which touch coordinates of a position touched by user's hand or finger are aggregated. The touched shape determination unit 81 calculates a touched shape 310 (see FIGS. 5A, 5B), which is a shape of a touched position, from the touched area 300 using a statistical model or the like. At this time, the touched shape determination unit 81 can calculate the touched shape 310 as a shape like multiple lines whose apexes are connected to each other.

When the touched shape 310 is in the hook-like shape as described below, the selection area setting/moving unit 82 sets the apparatus to the "aggregation" mode and sets an object selection area 320. The "aggregation" mode of the present embodiment is a mode (operation setting mode) for selecting and moving all objects which overlap at least partially the object selection area 320. The selection area setting/moving unit 82 can move all selected objects in correspondence to a change in coordinates of the touched shape 310. In addition, if the touched shape 310 is linear or no object selection area 320 is set, the selection area setting/moving unit 82 can select and move a single object.

The memory unit 9 is a storage means such as a semiconductor memory, a hard disk drive (HDD). The memory unit 9 stores image data acquired by reading a document with the document reading unit 2, printed document data transmitted from a personal computer (PC, not shown), a variety of files stored in a recording medium, data about coordinates and thumbnail image of the aforementioned object.

The image processing unit 10 is a control arithmetic operation unit for a digital signal processor (DSP) or a graphics processing unit (GPU). The image processing unit 10 is a means for performing a predetermined image processing on image data and image improvement processing, for example, enlargement/reduction processing, density adjustment, tone adjustment is performed.

The image forming apparatus 1 may include a network connection unit such as a LAN board for connecting to LAN or WAN. The control unit 8 and the image processing unit 10 may be configured integrally like a GPU incorporated CPU or chip-on-module package. Additionally, data about coordinates and images for drawing of the above-described "object" may be stored in the memory unit 9 or in a graphic dedicated memory (not shown) like VRAM in the image processing unit 10. The objects may be drawn separately from each other or such that at least part thereof overlaps.

[Object Selection/Moving Processing by Image Forming Apparatus 1]

Next, the object selection/moving processing which achieves an object selection method with the image forming apparatus 1 according to an embodiment of the present disclosure will be described with reference to FIGS. 3 to 5B. Hereinafter, each step will be described in detail with reference to a flowchart of FIG. 3.

Figure 3:
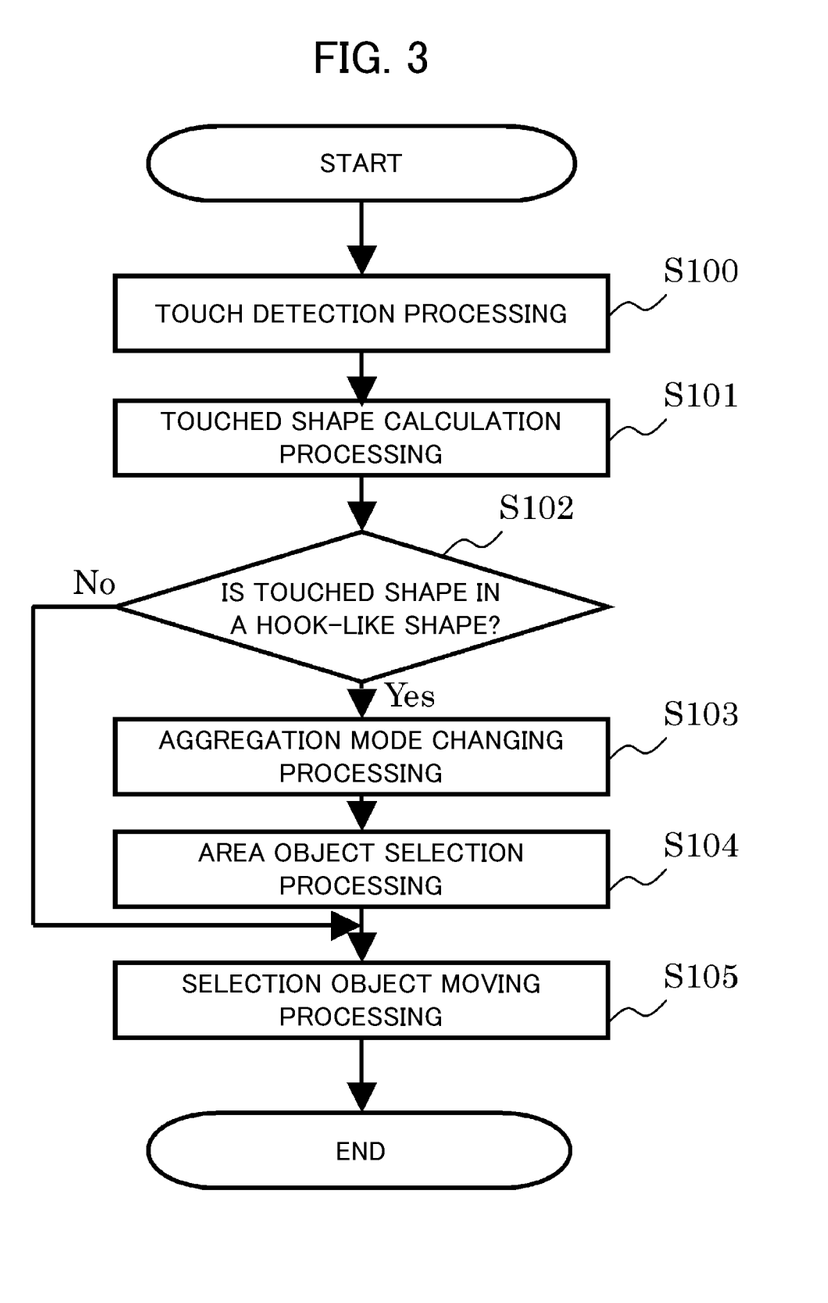
FIG. 3 is a flow chart of object selection processing according to the embodiment of the present disclosure.

(Step S100)

Figure 4:
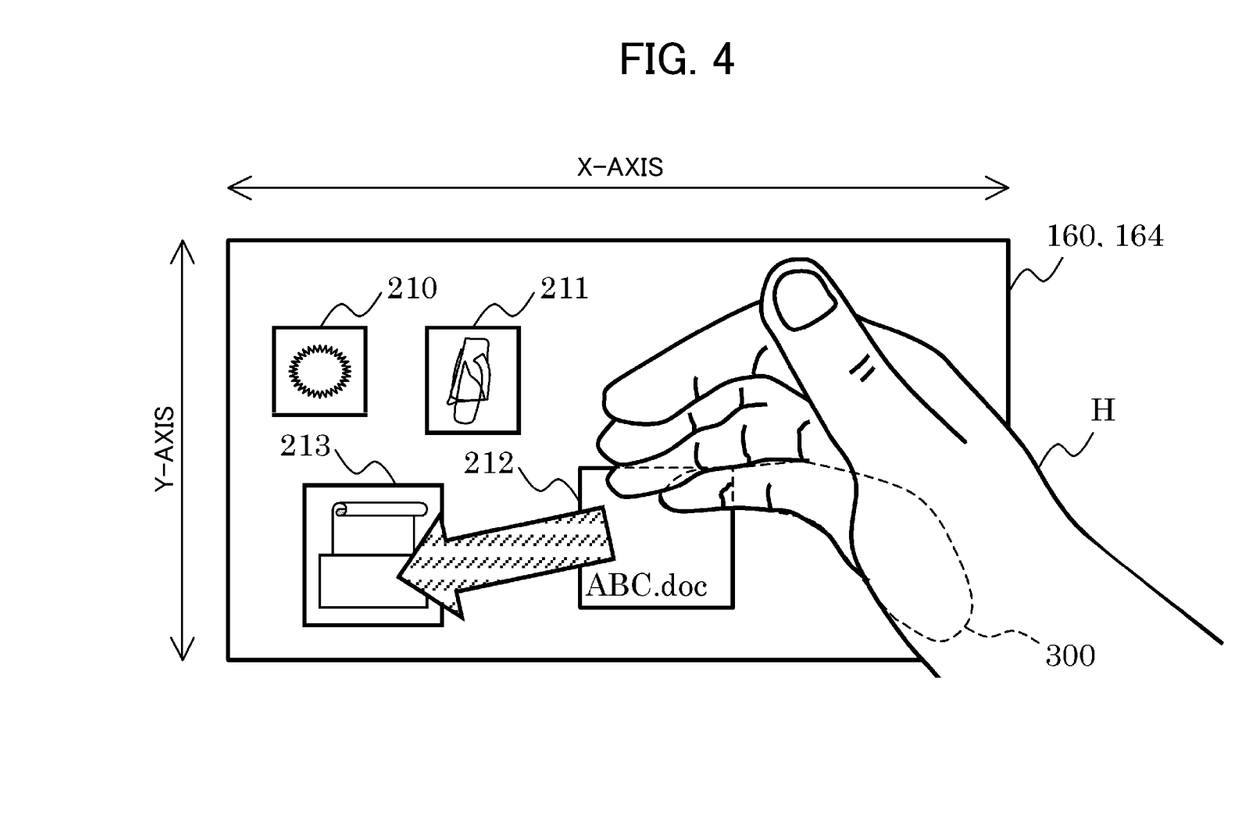
FIG. 4 is a conceptual diagram of object selection in the object selection detection processing according to the embodiment of the present disclosure.

The touch detection unit 164 of the operation panel unit 6 performs touch detection processing. Referring to FIG. 4, the display unit 162 displays a plurality of objects 210, 211, 212, 213 and the like. In this state, a hand H, which may be a user's hand or finger, is touching the display unit 162 of the operation panel unit 6. The touch detection unit 164 detects the touched position as touch coordinates. More specifically, the touch detection unit 164 detects that a sensor value of electrostatic capacity or the like has changed from a predetermined threshold. With the longitudinal direction and the lateral direction of the display unit 162 of the operation panel unit 6 as X-axis and Y-axis respectively while the left top of the panel unit is set to home position of (X-axis, Y-axis)=(0, 0), the touch detection unit 164 detects a plurality of the touch coordinates. If values acquired by a sensor at each divided position as described above are over a threshold, the touch detection unit 164 can detect the coordinates of all the positions as the touch coordinates. The touch detection unit 164 can detect a change in touch coordinates in a predetermined period in the form of a vector or the like and store them. Additionally, the touch detection unit 164 can detect a sign which is a user's instruction from this vector or the like.

(Step S101)

Next, the touched shape determination unit 81 of the control unit 8 performs touched shape calculation processing. The touched shape calculation processing will be described in detail with reference to FIG. 5A. First, the touched shape determination unit 81 aggregates a plurality of acquired touch coordinates and calculates the touched area 300 as a graphic area such as a polygon, closed curve by using the aforementioned coordinate system. When a plurality of the touch coordinates spaced more than a predetermined distance is detected, the touched shape determination unit 81 calculates a plurality of the touched areas 300.

Figure 5A:
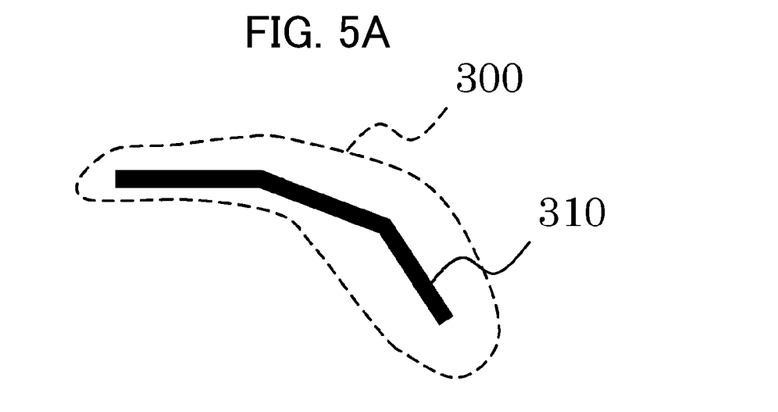
FIGS. 5A, 5B are conceptual diagrams about touched shape and object selection according to the embodiment of the present disclosure.

In addition, the touched shape determination unit 81 calculates the touched shape 310 which is a shape of the touch coordinates considered to be intended by a user from the touched area 300. The touched shape determination unit 81 obtains an area, a range, a gravity center and the like of the touch coordinates and estimates the touched shape 310 by way of a statistical model or the like. More specifically, the touched shape determination unit 81 obtains a relation between a condition of a curve of user's hand or finger joint and touch coordinates through the aforementioned statistical model or the like and calculates a corresponding touched shape 310. At this time, the touched shape determination unit 81 can calculate the touched shape 310 based on a model relating to a shape when mainly user's hand or "little finger" touches the display unit 162.

More specifically, for example, preferably, the touched shape determination unit 81 calculates the touched shape 310 as multiple lines (line strip) like a bent line, in which their apexes are connected to each other. Preferably, the touched shape determination unit 81 calculates a shape useful for estimating a position which the user likes to touch with his hand or finger on the display unit 162. At this time, the touched shape determination unit 81 does not have to calculate an apex of each line of the multiple lines such that it always corresponds to a position of each hand or finger joint. In addition, as the touched shape 310, it is permissible to store other areas with various kinds of curves or width information than the line strip.

If the touched area 300 is substantially circular or dot-like, the touched shape determination unit 81 determines that only the fingertip has touched and calculates the touched shape 310 as a dot. If a plurality of the touched areas 300 exists, the touched shape determination unit 81 may calculate multiple touched shapes thereof or may calculate the touched shape 310 by connecting these multiple touched areas 300. In addition, the touched shape determination unit 81 may be configured to be capable of estimating not only a shape of each of the little finger and the hand, but also, from the touch coordinates, a shape of the forefinger, middle finger, ring finger when the display unit is touched therewith and a difference between the right hand and the left hand.

(Step S102)

Next, the selection area setting/moving unit 82 of the control unit 8 determines whether the touched shape is in the hook-like shape. Here, the selection area setting/moving unit 82 determines whether the touched shape 310 is in a shape like a letter U (hereinafter referred to as "hook-like") as indicated in FIG. 5A. That is, if the touched shape 310 is a line between two points deviating in a concave or convex direction within a predetermined range, the selection area setting/moving unit 82 determines that the touched shape 310 is in the hook-like shape, that is, YES. In other cases, that is, if the touched shape 310 is dot-like or substantially a straight line, the selection area setting/moving unit 82 determines NO. If YES, the selection area setting/moving unit 82 brings the processing forward to step S103. If NO, the selection area setting/moving unit 82 brings the processing forward to step S105. At this time, when the touched shape 310 overlaps an object, the selection area setting/moving unit 82 selects that object. If the touched shape 310 overlaps multiple objects, the selection area setting/moving unit 82 selects at least an object drawn on the topmost face.

(Step S103)

If the touched shape 310 is close to the shape of the letter U, the selection area setting/moving unit 82 executes the "aggregation" mode changing processing. Describing with reference to FIG. 5B, first, the selection area setting/moving unit 82 calculates the object selection area 320. The selection area setting/moving unit 82 can calculate, for example, a closed area in which both ends of the hook-like touch shape 310 are connected to each other as the object selection area 320. Next, by calculating the object selection area 320, the selection area setting/moving unit 82 sets the "aggregation" mode which selects and moves all objects overlapping at least partly the object selection area 320. That is, when the touch detection unit 164 detects that a user has touched it with his or her finger in the hook-like shape, the selection area setting/moving unit 82 automatically sets the "aggregation" mode.

(Step S104)

Next, the selection area setting/moving unit 82 executes area object selection processing. The selection area setting/moving unit 82 detects and selects an object drawn such that it overlaps the coordinates of the object selection area 320. In an example of FIG. 5B, an object 212 and an object 214 are selected. Here, preferably, the selection area setting/moving unit 82 selects an object if part of the object exists within the object selection area 320, even without surrounding entirely the object. The area object selection processing may be executed with a physical engine such as the DSP, GPU of the image forming unit 10 at high speed.

(Step S105)

Here, the selection area setting/moving unit 82 executes selection object moving processing. More specifically, the selection area setting/moving unit 82 moves a selected object following a vector of changes in a predetermined period of the touch coordinates. FIG. 4 illustrates an example in which the selection area setting/moving unit 82 moves the selected object 212 in a direction indicated with an arrow to cause the object 212 to overlap the object 213. If the object selection area 320 is set up and a plurality of objects is selected, the selection area setting/moving unit 82 can move them in the same way as described above. If no object selection area 320 has been selected and an independent object has been selected also, the selection area setting/moving unit 82 moves the object. If a user slides his or her hand or finger in the hook-like form, a plurality of objects can be selected like by "aggregating" and moved. In addition, if the object selection area 320 comes to overlap other object during its moving, the selection area setting/moving unit 82 can select this object and move it likewise. The selection area setting/moving unit 82 can be configured not to select any object than an already selected object additionally during a moving.

The selection area setting/moving unit 82 can execute processing of providing moving of a selected object with inertia. That is, if a selected object is moved, the selection area setting/moving unit 82 can continue to move the object not only with a predetermined acceleration but also even if the object comes not to be included in the object selection area 320 and not to be selected. At this time, preferably, the selection area setting/moving unit 82 calculates a predetermined friction coefficient or the like and incrementally slows to a stop the objects not currently selected. Consequently, even if acquisition of the touch coordinates does not succeed due to an influence of a dry hand or noise or the hand leaves slightly, the objects can be "aggregated" in a stable manner. If no object has been selected, the selection area setting/moving unit 82 can execute other processing such as scroll, enlargement/reduction of a display screen, recognition of signs, characters and the like.

Figure 5B:
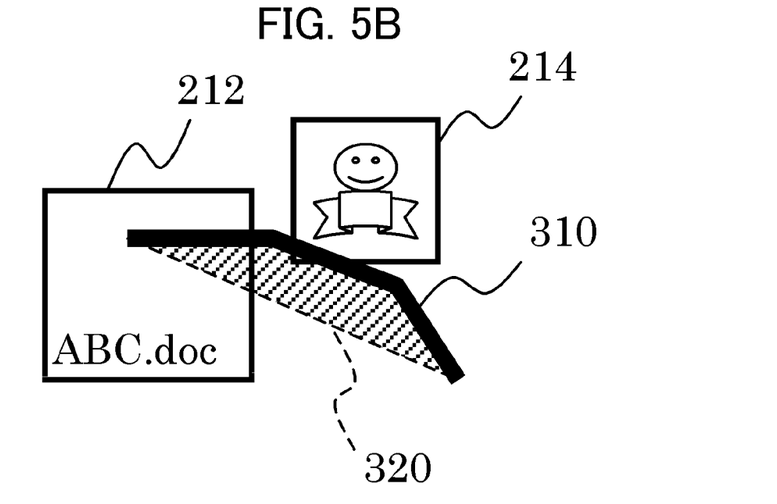

After that, for example, if the coordinates of a moved object overlap predetermined coordinates or an object, a user's hand or finger leaves a moved object, which has been moved, a sign is detected additionally during the moving of the object, pressing of a button in the button section 160 is detected or in like cases, the control unit 8 can execute a predetermined processing. The predetermined processing of the control unit 8 may include respective processings corresponding to functions of the image forming apparatus 1 such as printing, facsimile transmission, storage of data in a holder or a recording medium, moving and deletion of data, rearrangement, conversion of file format, conversion of file name, optical character recognition, calling of a program and the like. In the example of FIG. 4, the object 212 is an object which indicates a document file "ABC.doc". The object 213 is an object which has a function of executing print. Thus, if the object 212 is moved to overlap the object 213, the control unit 8 prints the document file "ABC.doc" which corresponds to the object 212. Likewise, if as shown in FIG. 5B, the object 212 and an object 214 which is an image file are selected and moved so as to overlap the object 213, the control unit 8 prints these files. Finally, the object selection moving processing terminates.

The above-described configuration provides following advantageous effects. The image forming apparatus 1 according to an embodiment of the present disclosure can select a drawn object without depending on the size of the object even if the object is larger than the finger. The image forming apparatus 1 of the present embodiment allows a user to select an object easily even if the object protrudes from the finger. The image forming apparatus 1 of the present embodiment functions when a user places his or her finger in the hook-like shape on the display unit 162. Thus, it is not necessary to set the "aggregation" mode directly using the button or the like thereby ensuring a high operability. Thus, the image forming apparatus 1 of the present embodiment facilitates selection of any object such as a thumbnail image or the like in a short time. That is, the image forming apparatus 1 allows a user to select a plurality of images by aggregating all at once even if their thumbnails are displayed on the display and execute a predetermined processing, such as printing. In addition, an object selection method of the present embodiment can aggregate the multiple objects displayed on the touch panel according to the "aggregation" mode.

The object selection method of the present embodiment may be applied to not only an image forming apparatus such as MFP, but also information terminal using various kinds of touch panels, personal computer (PC), personal data assistant (PDA), smart phone, desktop computer, electronic blackboard, digital signage, game machine and the like. Although an example in which the display unit 162 and the touch detection unit 164 are formed integrally with each other has been described in the above embodiment, the present disclosure is not restricted to this example.

By the way, the configuration and operation of the above-described embodiments are just an example and may be modified appropriately and executed within a scope not departing from the gist of the present disclosure.

What is claimed is:

1. An information processing apparatus comprising:
a display unit configured to display a plurality of objects;
a touch detection unit configured to detect a plurality of touch coordinates on the display unit;
a touched shape determination unit configured to calculate a touched shape from the touch coordinates detected by the touch detection unit; and
a selection area setting/moving unit configured to:
calculate an object selection area that represents a closed area for a case where the touched shape is in a hook-like shape, and have an aggregation mode which selects and moves all objects that overlap at least partly the object selection area,
wherein if the touched shape includes a predetermined portion which deviates in a concave or convex direction from a line connecting two end points of the touched shape,
the selection area setting/moving unit is further configured to:
determine that the touched shape is in the hook-like shape;
calculate the closed area in which both ends of the touched shape in the hook-like shape are connected to each other as the object selection area which is an approximation of an area touched by a user when the touch detection unit detects the user having touched the display unit with a finger in a hook-like shape; and set automatically the aggregation mode and move an entirety of a plurality of objects when the plurality of objects is selected by the selection area setting/moving unit, and wherein if the touched shape is like a dot or substantially a straight line, the selection area setting/moving unit is further configured to:

determine that the touched shape is not in the hook-like shape; and select and move at least one of a plurality of objects which is displaced at a highest location on a surface the display unit when the touched shape overlaps the plurality of objects.

2. The information processing apparatus according to claim 1, wherein if part of an object exists within the object selection area, the selection area setting/moving unit is configured to select the object.

3. The information processing apparatus according to claim 1, wherein the touch detection unit calculates the touched shape from a relation between the touch coordinates and a condition of a curve of a hand or finger when the hand or finger touches the display unit.

4. The information processing apparatus according to claim 1, wherein the selection area setting/moving unit is configured to select and move a new object if the new object comes to overlap the object selection area during the moving performed by the selection area setting/moving unit.

5. The information processing apparatus according to claim 1, wherein the selection area setting/moving unit is configured to refrain from additionally selecting other object than an already selected object during the moving of the object performed by the selection area setting/moving unit.

6. The information processing apparatus according to claim 1, wherein when a selected object is moved, the selection area setting/moving unit is configured to continue to move the object by applying a predetermined acceleration even if the object comes not to be included in the object selection area so that the object is not selected.

7. The information processing apparatus according to claim 6, wherein the selection area setting/moving unit is configured to calculate a predetermined friction coefficient and incrementally slows to a stop the objects not currently selected.

8. An image forming apparatus comprising the information processing apparatus according to claim 1.

* * * * *